(12) United States Patent
Awakawa et al.

(10) Patent No.: US 8,936,303 B2
(45) Date of Patent: Jan. 20, 2015

(54) CABLE ROUTING STRUCTURE FOR VEHICLE

(75) Inventors: Hirobumi Awakawa, Shizuoka-ken (JP); Sachiko Iwamatsu, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 789 days.

(21) Appl. No.: 13/183,006

(22) Filed: Jul. 14, 2011

(65) Prior Publication Data

US 2012/0024598 A1 Feb. 2, 2012

(30) Foreign Application Priority Data

Jul. 28, 2010 (JP) ................... 2010-168989

(51) Int. Cl.
*B60H 1/24* (2006.01)
*H02G 3/04* (2006.01)
*B60R 16/02* (2006.01)

(52) U.S. Cl.
CPC .......... *H02G 3/0462* (2013.01); *B60R 16/0215* (2013.01)
USPC ....................................... 296/208

(58) Field of Classification Search
CPC ..................... B60H 1/246; B60H 1/00528
USPC ............... 296/208; 174/70 R, 650, 655, 657; 180/65.1; 165/67
See application file for complete search history.

(56) References Cited

U.S. PATENT DOCUMENTS 7,497,284 B2 * 3/2009 Yamaguchi et al. ......... 180/65.1

FOREIGN PATENT DOCUMENTS

JP 4038464 11/2007

* cited by examiner

*Primary Examiner* — Joseph D Pape
*Assistant Examiner* — Dana Ivey
(74) *Attorney, Agent, or Firm* — Alston & Bird LLP (57) ABSTRACT

A cable routing structure for vehicle can reliably prevent a cable from being broken or damaged, and can reduce manufacturing cost. A cable is routed along a lower surface of a floor panel and connects a power generating motor installed in a vehicle front portion and a battery installed in a vehicle rear portion. A rigid tubular member having rigidity, is disposed along a vehicle front and rear direction in a floor tunnel. A flexible tubular member having flexibility is interposed between the rigid tubular member and the power generating motor. The cable is inserted through the rigid tubular member and the flexible tubular member. A front end portion of the rigid tubular member is disposed in the floor tunnel at a portion on a vehicle rear side relative to a front edge of the floor tunnel. When receiving pressure from a vehicle front side, the flexible tubular member is forcibly bent so as to be entered into in the floor tunnel.

4 Claims, 6 Drawing Sheets

CABLE ROUTING STRUCTURE FOR VEHICLE

FIELD OF THE INVENTION

The present invention relates to a cable routing structure for vehicles, including a cable being routed along a lower surface of a floor panel, and connecting a power generating motor which is installed in a front part of the vehicle, and a battery which is installed in a rear part of the vehicle.

BACKGROUND OF THE INVENTION

In hybrid electric vehicles (HEVs), electric vehicles (EVs), and the like, a cable connecting a power generating motor which is installed in a front part of the vehicle, and a battery which is installed in a rear part of the vehicle, is disposed along a front direction and rear direction of the vehicle. Therefore, the cable must be prevented from being broken or damaged in an emergency, such as collision of the vehicle, so as not to give a high voltage electric shock to an occupant or to a rescuer.

Accordingly, as disclosed in Japanese Patent No. 4038464, the following method has been proposed. A protective cover having such an L-shape so as to bend a cable in a crank shape in a side view, is attached to a gear case. In addition, the cable is configured to be bent (see, FIG. 4 in Japanese Patent No. 4038464) when receiving compressing force from the front side due to the front collision of the vehicle. This approach prevents the cable from being broken or damaged.

BRIEF SUMMARY OF THE INVENTION

Unfortunately, the conventional method requires high manufacturing cost for the protective cover because of the complex shape of the protective cover. In addition, the cable is exposed at portions around the protective cover. For this reason, the cable may be broken or damaged at the portions around the protective cover by interfering with other components. The protective cover may be formed so as to cover the otherwise exposed portion of the cable, but this method leads to even higher manufacturing cost for the protective cover.

The present invention is made in view of the above-described circumstances, and an object of the present invention is to provide a cable routing structure for vehicles, which can reliably prevent the cable from being broken or damaged, and can reduce the manufacturing cost.

A feature of the present invention is a cable routing structure for a vehicle including: a cable being routed along a lower surface of a floor panel, and connecting a power generating motor which is installed in a front part of the vehicle, and a battery which is installed in a rear part of the vehicle; a rigid tubular member having rigidity, and being disposed along a vehicle front-rear direction in an upwardly convex floor tunnel formed in the floor panel; and a flexible tubular member having flexibility, and being interposed between the rigid tubular member and the power generating motor; in which the cable is inserted through the rigid tubular member and the flexible tubular member; and in which a front end portion of the rigid tubular member is disposed in the floor tunnel at a portion on a vehicle rear side relative to a front edge of the floor tunnel, such that, upon receiving compressing force from a vehicle front side, the flexible tubular member is forcibly bent so as to be entered into the floor tunnel.

With the above structure, when the flexible tubular member having flexibility receives compressing force from the vehicle front side, the flexible tubular member is forcibly bent so as to be entered into the floor tunnel. The front end portion of the rigid tubular member is disposed in the floor tunnel at the portion on a vehicle rear side relative to the front edge of the floor tunnel. Therefore, the forcibly bent flexible tubular member and the cable can be smoothly entered into the floor tunnel at a portion at the front side of the front end portion of the rigid tubular member.

Accordingly, the floor tunnel can protect the flexible tubular member and the cable which are entered into the floor tunnel, whereby the flexible tubular member can be prevented from deforming, and the cable can be prevented from being broken or damaged.

The flexible tubular member is forcibly bent into the floor tunnel so that the force applied due to the collision can be relieved. Therefore, the flexible tubular member can be prevented from deforming, and the cable can be prevented from being broken or damaged more effectively. Furthermore, the cable is covered by the tubular members (rigid tubular member and the flexible tubular member). Therefore, the structure can be simplified, and the manufacturing cost can be reduced compared with the case in which the cable is covered by an L-shaped cover.

In the present invention, the following effect can be obtained if the front end portion of the flexible tubular member is attached to a bracket which is attached to an engine system component.

When the flexible tubular member receives compressing force from the vehicle front side, the flexible tubular member receives compressing force from the engine system component via the bracket fixed to the engine system component. The compressing force is reliably transmitted to the flexible tubular member because the engine system component is a large component. Therefore, the flexible tubular member can be more easily pressed into the floor tunnel along with the movement of the engine system component, whereby the cable can be reliably prevented from being wedged between a dash panel and the engine type component.

In the present invention, the following effect can be obtained if the front end portion of the flexible tubular member is attached to the bracket of the engine system component by a clamp, the rigid tubular member is disposed closer to one sidewall of the floor tunnel, and the clamp is disposed closer to another sidewall of the floor tunnel, such that, when receiving compressing force from the vehicle front side, the flexible tubular member is entered into a space between the rigid tubular member and the clamp.

The space into which the flexible tubular member forcibly bent by the bracket is entered, can be provided in the tunnel because the rigid tubular member is disposed closer to the one sidewall of the floor tunnel. The clamp is disposed closer to another sidewall of the floor tunnel and thus, upon receiving the compressing force from the vehicle front side, the flexible tubular member is entered into the space between the rigid tubular member and the clamp. Therefore, the cable in the flexible tubular member receives the smallest possible bending load, whereby the cable can be reliably prevented from being broken or damaged.

In the present invention, the following effects can be obtained if a rear portion of the cable enters a cabin through a cabin entrance pipe, a rear side flexible tubular member having flexibility is interposed between a rear end portion of the rigid tubular member and the cabin entrance pipe, the cable is inserted through the rear side flexible tubular member, and the rear side flexible tubular member passes between a suspension frame and the lower surface of the floor panel.

The rear side flexible tubular member is provided between the rear end portion of the rigid tubular member, and the cabin entrance pipe and the cable is inserted in the rear side flexible tubular member. Therefore, impact applied upon rear collision of the vehicle can be relieved by the bending of the rear side flexible tubular member. Accordingly, the cable can be prevented from being severed or damaged due to the breakage or bending of the rear side flexible tubular member.

Furthermore, the rear side flexible tubular member passes between the suspension frame and the lower surface of the floor panel so that the rear side flexible tubular member can be protected by the suspension frame and the floor panel. Therefore, the cable can be prevented from being wedged between the suspension frame and the vehicle body, and can be prevented from being broken or damaged.

According to the present invention, the cable routing structure for vehicle can reliably prevent the cable from being broken or damaged, and can reduce the manufacturing cost.

DETAILED DESCRIPTION OF THE DRAWINGS

An embodiment of the present invention is described based on the drawings.

Figure 1:
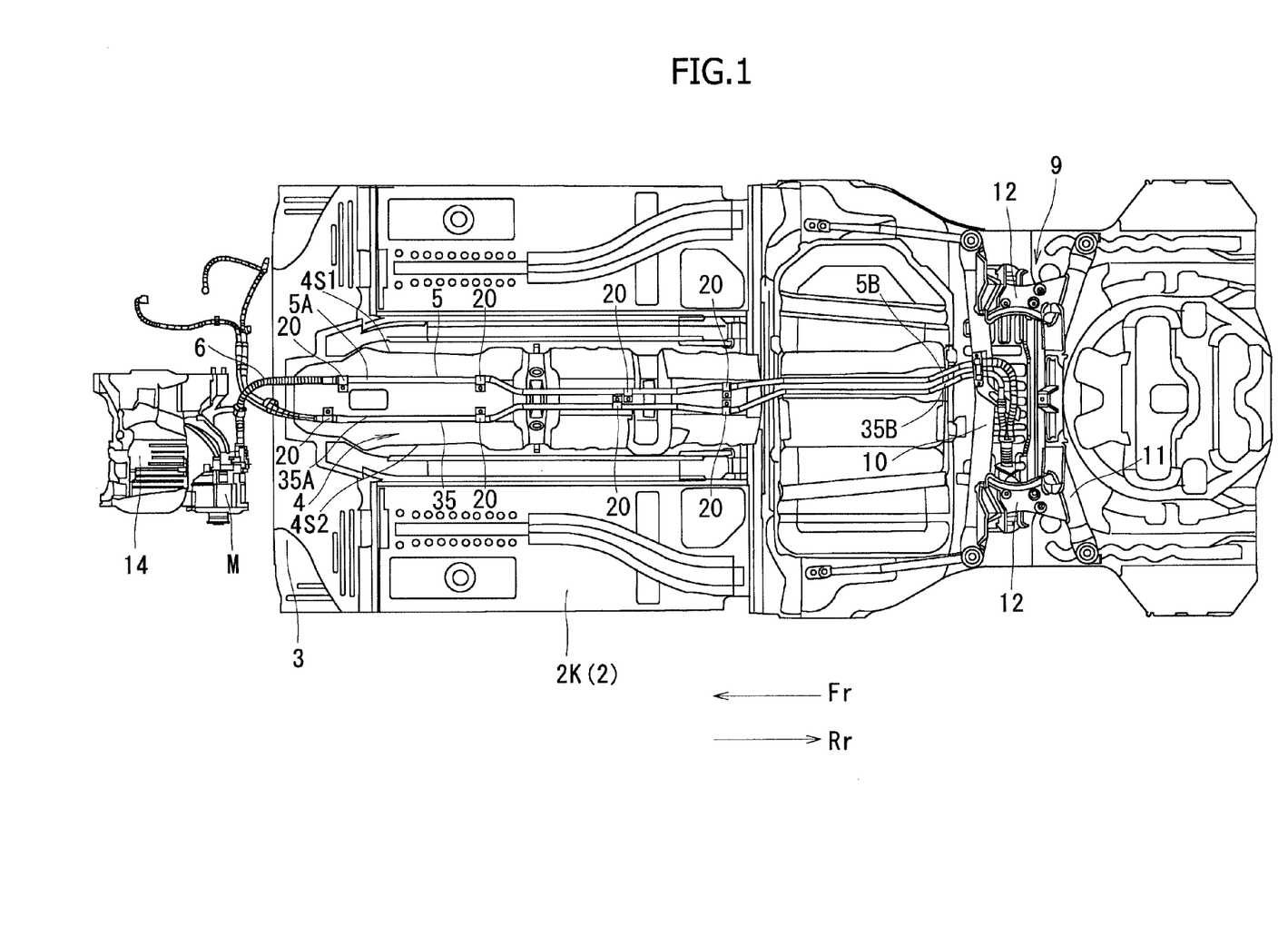
FIG. 1 is a diagram showing a cable routing structure for a vehicle as viewed in a bottom view of the vehicle.
Figure 2:
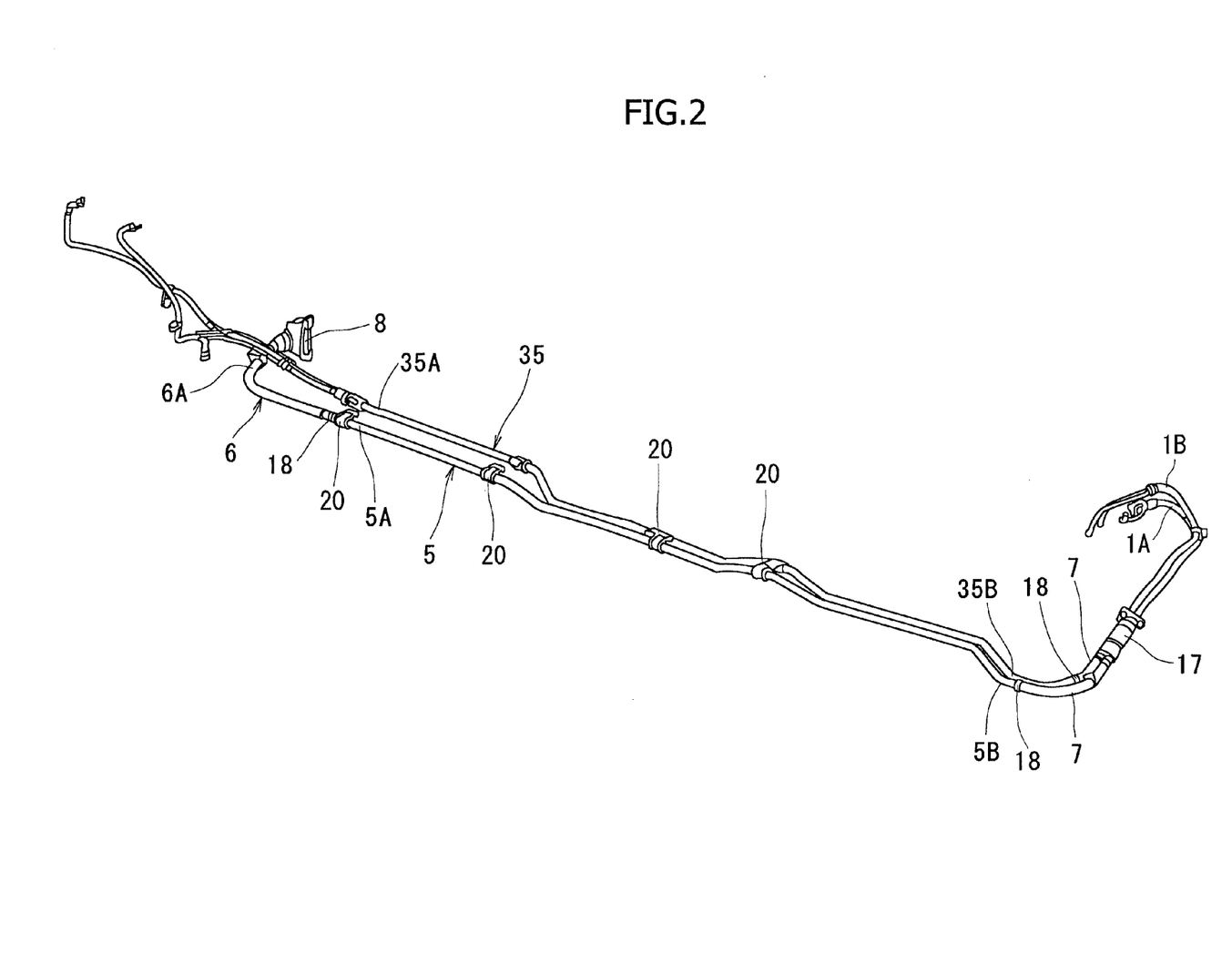
FIG. 2 is an overall perspective view of cables not being mounted to the vehicle.

FIG. 1 and FIG. 2 show a cable routing structure for a hybrid electric vehicle (HEV). In this cable routing structure, a first cable 1A connecting a power generating motor M which is installed in a front part of the vehicle and a battery (HEV battery, not shown) which is installed in a trunk compartment at a rear part of the vehicle, is routed along a lower surface 2K of a floor panel 2, and a second cable 1B connecting the battery and an electrical component such as an auxiliary battery is routed along the lower surface 2K of the floor panel 2. The first cable 1A and the second cable 1B are each formed by bundling multiple cable wires.

A lower end portion of a dash panel 3 separating an engine compartment and a cabin is connected to a front end portion of the floor panel 2. In a central portion of the floor panel 2 in a vehicle width direction, an upwardly convex floor tunnel 4 is formed extending from the front end portion side to the central portion of the floor panel 2 in the vehicle front and rear direction.

Figure 7:
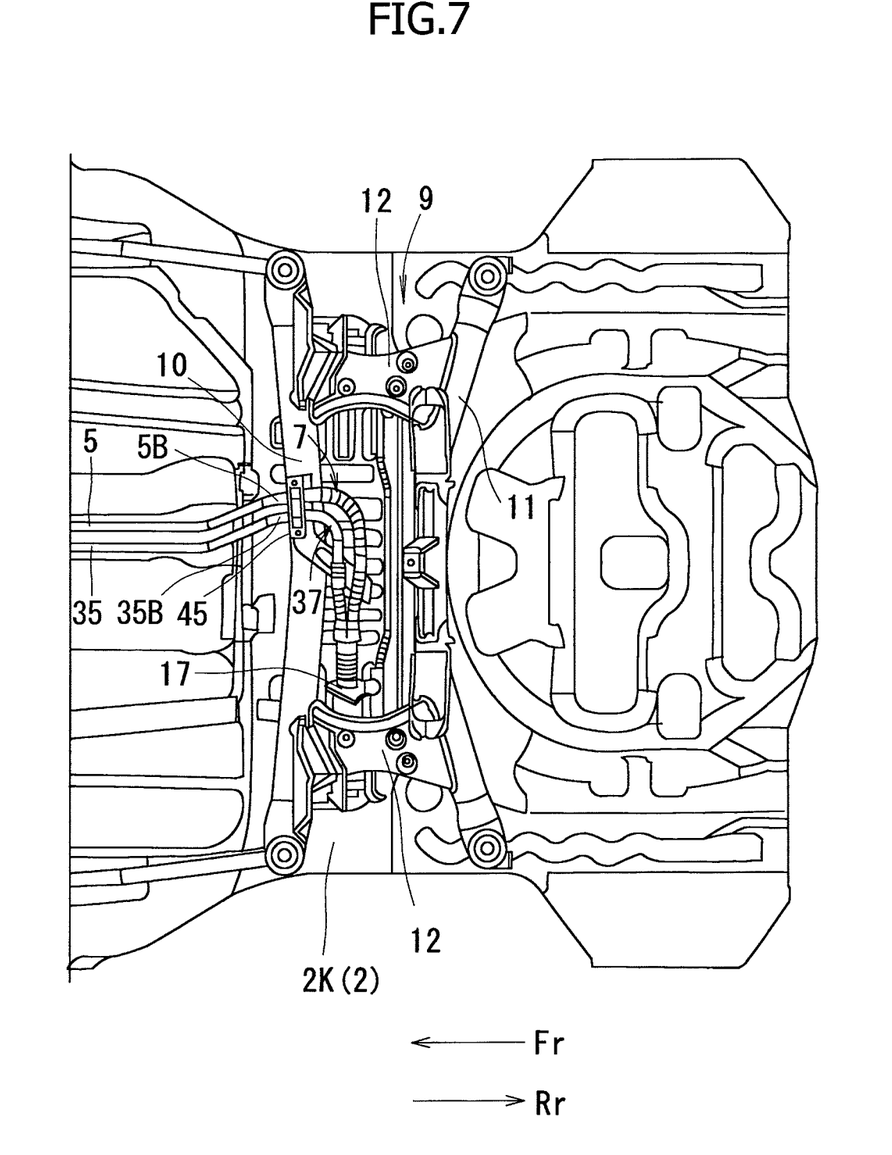
FIG. 7 is a diagram showing a rear portion of the cable routing structure for a vehicle in a bottom view of the vehicle.

As also shown in FIG. 7, a suspension frame 9 is disposed below a rear portion of the floor panel 2 which is located rearward of the floor tunnel 4. The suspension frame 9 is formed in a parallel cross shape elongated in the vehicle width direction. A front side frame 10 and a rear side frame 11 of the suspension frame 9 are each laid between a pair of left and right side members.

The front side frame 10 and the rear side frame 11 are each formed of a tubular pipe member made of metal. The front side frame 10 is bent so as to be arched toward a vehicle rear side Rr, whereas the rear side frame 11 is bent to be arched toward a vehicle front side Fr. A pair of left and right connecting frames 12 which connects the front side frame 10 and the rear side frame 11 is wide in the vehicle width direction. Each of the connecting frames 12 has both end portions in the vehicle front and rear direction wider than a central portion in the vehicle front-rear direction.

Both end portions of a supporting bracket 45 having a shape of a hat opened at an upper side in cross section, are connected to a lower surface of a central portion of the front side frame 10 in the longitudinal direction. A pipe insertion hole is formed by the front side frame 10 and the support bracket 45.

As shown in FIG. 1 and FIG. 2, a pair of left and right rigid aluminum pipes 5 and 35 (serving as rigid tubular members) made of aluminum, are provided along the vehicle front-rear direction in the floor tunnel 4 formed in the floor panel 2. A flexible front and side rubber tube 6 (serving as flexible tubular member) is provided between the left-side aluminum pipe 5 and the power generating motor M. The first cable 1A is inserted in the left-side aluminum pipe 5 and the front-side rubber tube 6, whereas the second cable 1B is inserted in the right-side aluminum pipe 35. The left-side aluminum pipe 5 and the right-side aluminum pipe 35 are attached to inner peripheral portions of the floor tunnel 4 by multiple attachment members 20.

Routing Structure for Front Part of Cable

Figure 5:
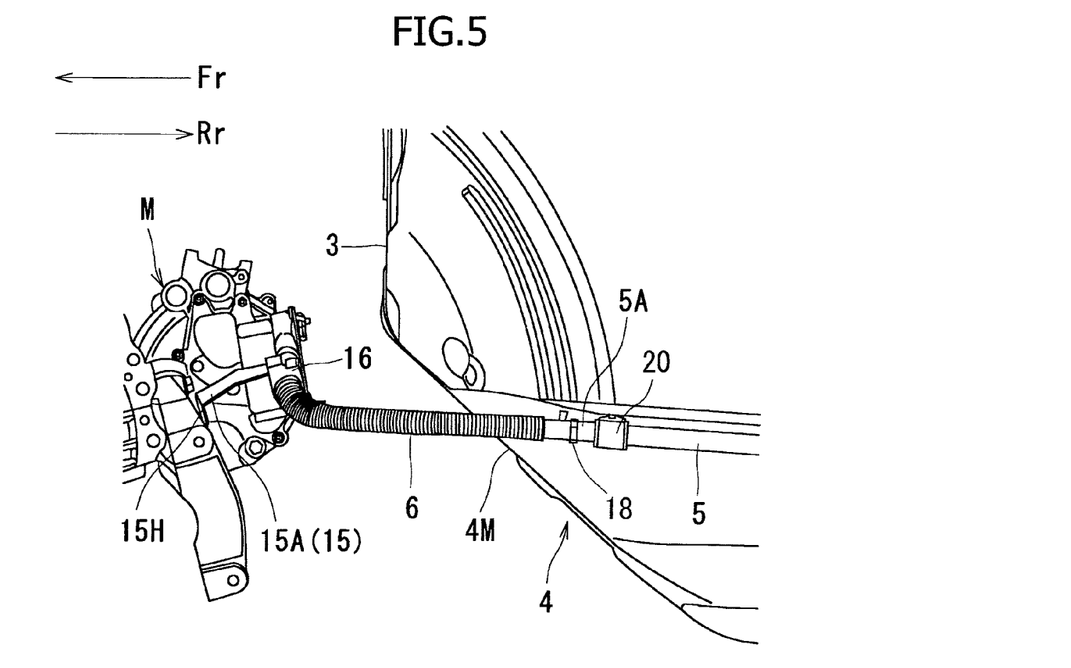
FIG. 5 is a cross-sectional view showing the cable in a normal state as viewed in a vehicle lateral direction.

A front end portion 5A (end portion on the vehicle front side Fr) of the left-side aluminum pipe 5 and a front end portion 35A of the right-side aluminum pipe 35, are disposed in the floor tunnel 4 at portions on the vehicle rear side Rr relative to a front edge 4M of the floor tunnel 4 (see FIG. 5). A rear end portion 5B (end portion on the vehicle rear side Rr) of the left-side aluminum pipe 5, and a rear end portion 35B (end portion on the vehicle rear side Rr) of the right-side aluminum pipe 35, protrude toward the vehicle rear side Rr from a rear end portion of the floor tunnel 4.

Figure 3:
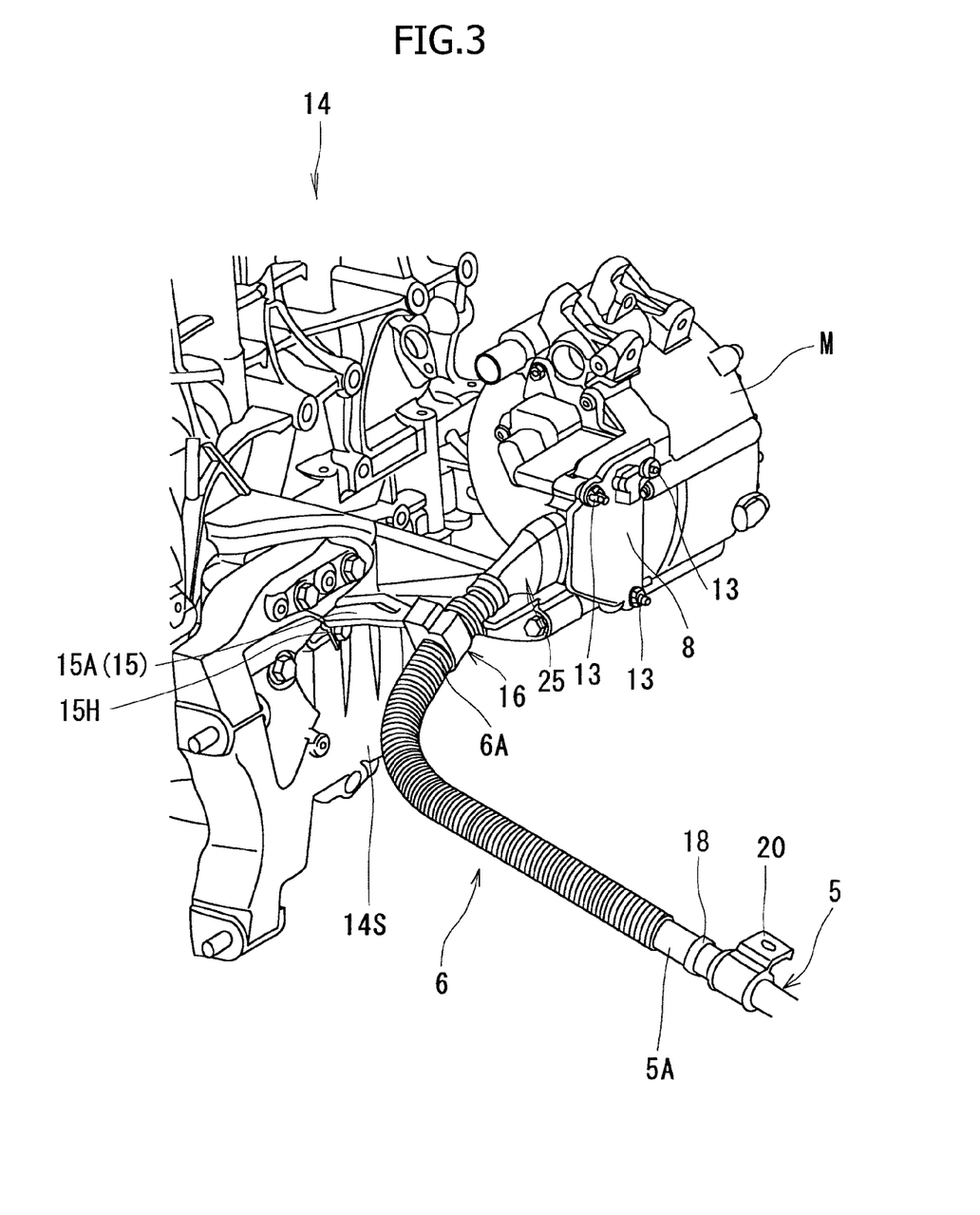
FIG. 3 is a perspective view showing a cable and peripheral components in an engine compartment.
Figure 4:
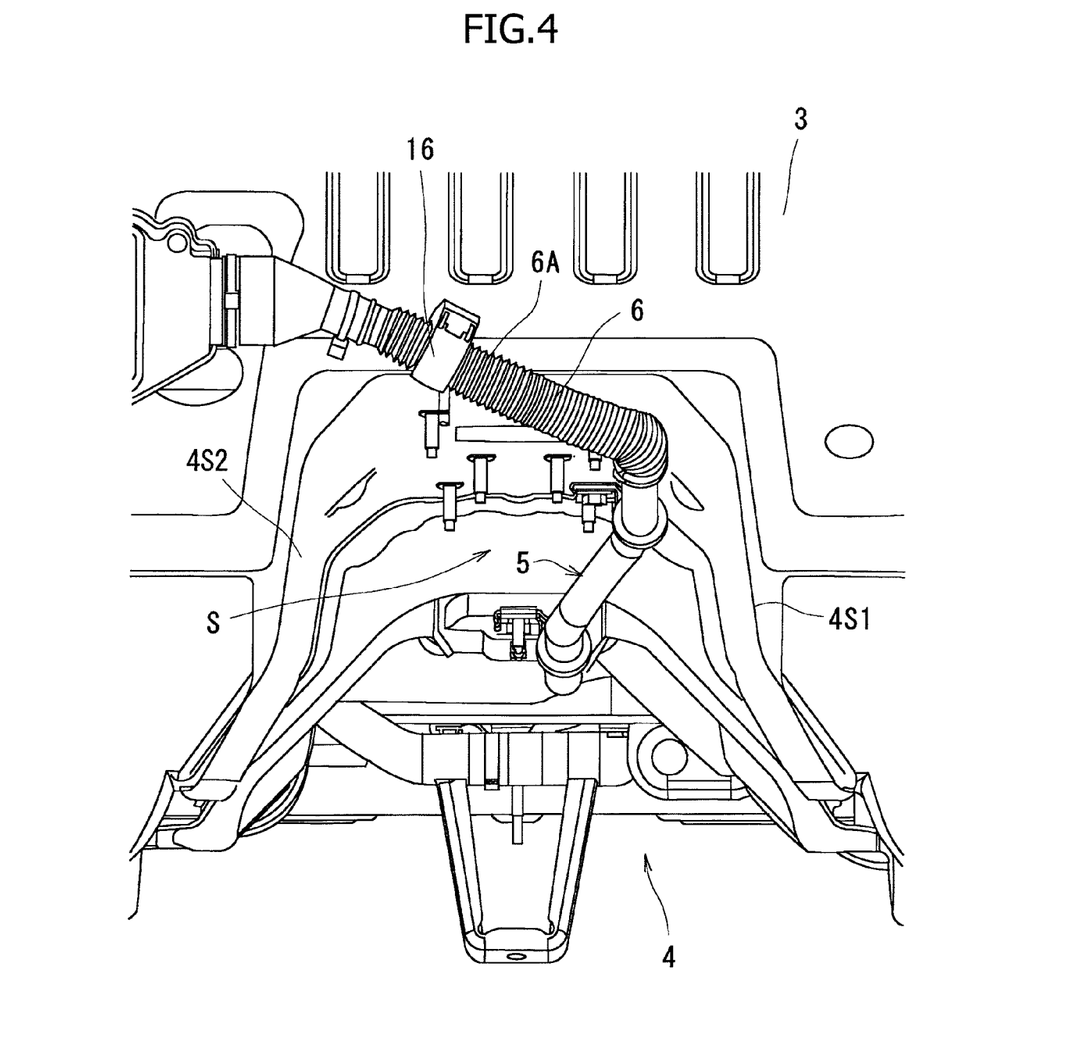
FIG. 4 is a perspective view showing an inner structure of a floor tunnel.

As shown in FIG. 3 and FIG. 4, the front-side rubber tube 6 is formed in the shape of a bellows. A trapezoidal plate-shaped motor attachment portion 8 is connected to a front end portion 6A of the front-side rubber tube 6 via a tubular cover 25. The cover 25 has an oval shape in cross section, and is connected to the motor attachment portion 8. The motor attachment portion 8 is fixed to a mounted portion on the power generating motor M using multiple bolts 13.

As shown in FIG. 1 and FIG. 3, the power generating motor M is located on the lateral side and on the vehicle front side Fr of the floor tunnel 4 (lateral front side of the front end portion of the floor tunnel 4 in the plan view) while facing a vehicle lateral side such that a rotational axis thereof extends along the vehicle width direction (left-right direction). A drive unit 14 (serving as engine system component) is located on the vehicle front side Fr of the power generating motor M.

The front-side rubber tube 6 extends toward the vehicle front side Fr from the front end portion 5A of the left-side aluminum pipe 5, and is bent at a lateral side of the power generating motor M at a substantially right angle to be connected to the power generating motor M.

A sidewall 14S of the drive unit 14 is located in front of the power generating motor M, the sidewall 14S having a wall surface facing the vehicle rear side Rr. A mounting piece 15H (see FIG. 3 and FIG. 5) of a bracket 15 on the base end side is bolted to the sidewall 14S, and a bracket main body 15A of the bracket 15 extends toward an outer side of the sidewall 14S. The front end portion 6A of the front-side rubber tube 6 is fixed to a distal portion of the bracket main body 15A by a clamp 16. The clamp 16 clamps the front end portion 6A of the front-side rubber tube 6 with a pair of arc shaped clamping portions to fix the front end portion 6A of the front-side rubber tube 6 to the bracket main body 15A.

Routing Structure for Rear Part of Cable

As shown in FIG. 7, rear portions of the first cable 1A and the second cable 1B are put together to enter the cabin through a single cabin entrance pipe 17. Flexible rear-side rubber tubes 7, 37 (serving as rear side flexible members) are respectively provided between the rear end portion 5B of the left-side aluminum pipe 5 and the cabin entrance pipe 17 and between the rear end portion 35B of the right-side aluminum pipe 35 and the cabin entrance pipe 17. The first cable 1A and the second cable 1B are respectively inserted in the pair of left and right rear-side rubber tubes 7, 37.

The pair of left and right rear-side rubber tubes 7, 37 are inserted in the pipe insertion hole of the suspension frame 9 from the vehicle front side Fr, and are supported by the supporting bracket 45 and the front side frame 10. Instead of the structure, the pair of left and right rear-side rubber tubes 7, 37 may be passed through between the front side frame 10 and the lower surface 2K of the floor panel 2.

The pair of left and right aluminum pipes 5 and 35 are inserted into and through the pipe insertion holes from the vehicle front side Fr, and then, are bent toward one side (right side) in the vehicle width direction at a substantially right angle to be connected to the cabin entrance pipe 17. The cabin entrance pipe 17 is positioned on the inner side in the vehicle width direction of one of the connecting frames 12 in the suspension frame 9, and is positioned near the connecting frame 12.

Structure for Preventing Cable from Being Broken or Damaged

The second cable 1B to be connected to the electrical component such as an auxiliary battery protrudes from the front end portion 35A of the right-side aluminum pipe 35, then is routed upward along the engine room side surface of the dash panel 3 while being fixed as needed, and is connected to the electrical component. The second cable 1B has a small amount of electricity to transmit therethrough, which is not likely to cause electrical shock, and no large components by which the second cable may be wedged to be broken exist around the second cable 1B.

On the other hand, the first cable 1A is connected to the power generating motor M, and has a large amount of power to transmit therethrough. Therefore, electrical shock due to high voltage caused by the first cable 1A, needs to be reliably prevented. Furthermore, the drive unit 14 which is a large component, is disposed near the power generating motor M. For this reason, when the engine compartment is crushed by the front collision of the vehicle and the like, the first cable 1A may be broken or damaged by being wedged between the drive unit 14 and the dash panel 3.

Accordingly, as described above, the front end portion 5A of the left-side aluminum pipe 5 (end portion on the vehicle front side Fr) and the front end portion 35A of the right-side aluminum pipe 35, are disposed in the floor tunnel 4 at portions on the vehicle rear side Rr relative to the front edge 4M of the floor tunnel 4. In this way, the front-side rubber tube 6 is forcibly bent so as to be entered into the floor tunnel 4 when the front-side rubber tube 6 receives compressing force from the vehicle front side Fr due to the front collision of the vehicle.

Furthermore, as shown in FIG. 4, the left-side aluminum pipe 5 is disposed closer to one sidewall 4S1 of the floor tunnel 4 and the clamp 16 that fixes the left-side aluminum pipe 5 to the bracket 15 of the drive unit 14 is disposed closer to the other sidewall 4S2 of the floor tunnel 4. Therefore, when receiving compressing force from the vehicle front side Fr, the front-side rubber tube 6 is entered into a space S between the left-side aluminum pipe 5 and the clamp 16.

As shown in FIG. 2, the front end portion 5A of the left-side aluminum pipe 5 and the front-side rubber tube 6, as well as the rear end portion 5B of the left-side aluminum pipe 5 and the rear-side rubber tube 7, are each swaged by a stainless steel band 18. This makes it possible to achieve the effect of preventing the first cable 1A from being broken or damaged without impairing the water proof property of a portion of the first cable 1A which is disposed outside the cabin, and furthermore, makes it possible to facilitate the mountability to the vehicle.

Figure 6:
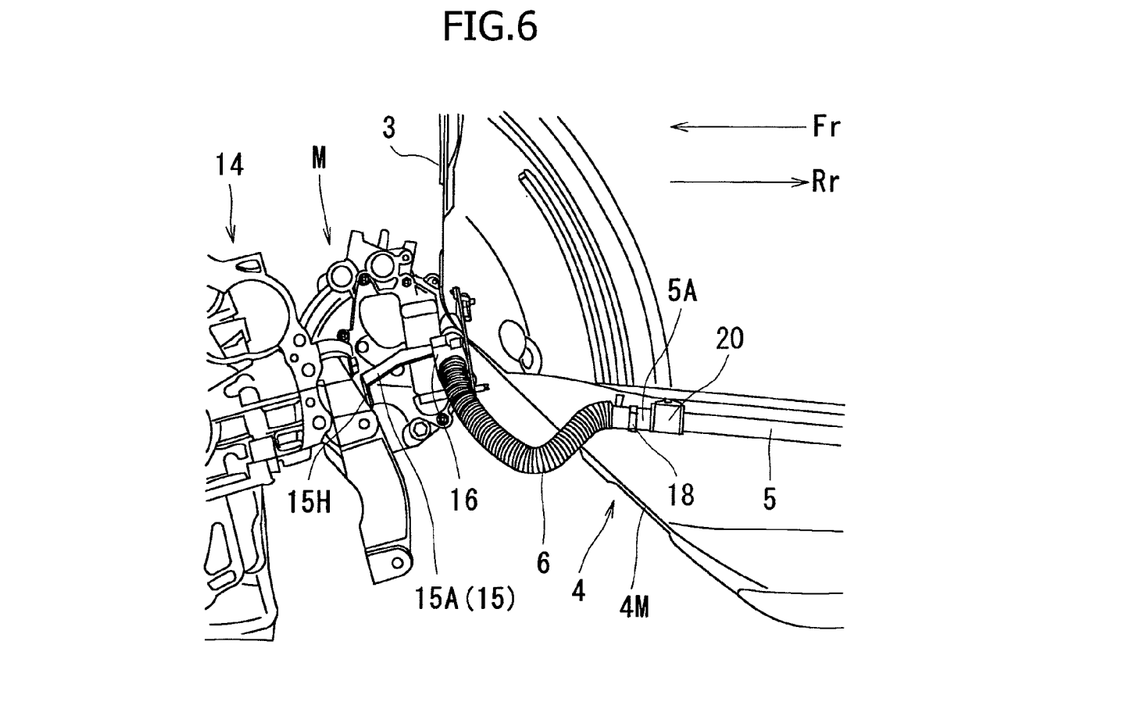
FIG. 6 is a cross-sectional view showing the cable at the time of front collision as viewed in the vehicle lateral direction.

With the above configuration, (1) as shown in FIG. 5 and FIG. 6, when the front-side rubber tube 6 receives compressing force from the vehicle front side Fr due to the front collision (frontal collision) of the vehicle, the flexible front-side rubber tube 6 is forcibly bent to be incorporated in the floor tunnel 4.

The front end portion 5A of the left-side aluminum pipe 5 is disposed in the floor tunnel 4 at the portion on the vehicle rear side Rr relative to the front edge 4M of the floor tunnel 4. Therefore, the forcibly bent front-side rubber tube 6 and the first cable 1A can be entered into the floor tunnel 4 at a portion at the front of the front end portion 5A of the left-side aluminum pipe 5.

Accordingly, the floor tunnel 4 can protect the front-side rubber tube 6 and the first cable 1A which is entered into the floor tunnel 4, whereby the left-side aluminum pipe 5 can be prevented from deforming, and the first cable 1A can be prevented from being broken or damaged.

Furthermore, the front-side rubber tube 6 is forcibly bent into the floor tunnel 4 so that the force applied by the collision, can be relieved. Therefore, the front-side rubber tube 6 can be prevented from deforming, and the first cable 1A can be prevented from being broken or damaged more effectively.

(2) When the front-side rubber tube 6 receives compressing force from the vehicle front side Fr, the front-side rubber tube 6 receives compressing force from the drive unit 14 via the bracket 15 fixed to the drive unit 14. The compressing force is reliably transmitted to the front-side rubber tube 6 because the drive unit 14 is a large component. Therefore, the front-side rubber tube 6 can be more easily pressed into the floor tunnel 4 along with the movement of the drive unit 14, whereby the first cable 1A can be reliably prevented from being wedged between the dash panel 3 and the drive unit 14.

(3) The space S into which the front-side rubber tube 6 forcibly bent by the bracket 15 is entered, can be provided in the floor tunnel 4 because the left-side aluminum pipe 5 is disposed closer to the one sidewall 4S1 of the floor tunnel 4.

The clamp 16 is disposed closer to the other sidewall 4S2 of the floor tunnel 4 and when receiving the compressing force from the vehicle front side Fr, the front-side rubber tube 6 is entered into the space S between the left-side aluminum pipe 5 and the clamp 16. Therefore, the first cable 1A in the front-side rubber tube 6 receives the smallest possible bending load, whereby the first cable 1A can be reliably prevented from being broken or damaged.

(4) The rear-side rubber tube 7 is provided between the rear end portion 5B of the left-side aluminum pipe 5 and the cabin entrance pipe 17 and the first cable 1A is inserted in the rear-side rubber tube 7. Therefore, impact applied upon rear collision of the vehicle can be relieved by bending of the rear-side rubber tube 7. Accordingly, the first cable 1A can be prevented from being severed or damaged due to the breakage or bending of the rear-side rubber tube 7.

Other Embodiments (1) If the rear-side rubber tube 7 passes between the suspension frame 9 and the lower surface 2K of the floor panel 2, the rear-side rubber tube 7 can be protected by the suspension frame 9 and the floor panel 2. Therefore, the first cable 1A can be prevented from being wedged between the suspension frame 9 and the vehicle body, and can be prevented from being broken or damaged.

(2) Although the embodiments are described with a hybrid electric vehicle (HEV) as an example, the present invention can be also applied to an electric vehicle (EV).

What is claimed is:

1. A cable routing structure for a vehicle, comprising:
a cable, the cable routed along a lower surface of a floor panel, and connecting a power generating motor which is installed in a front part of the vehicle, and a battery which is installed in a rear part of the vehicle;
a rigid tubular member, the rigid tubular member having rigidity and being disposed along a vehicle front and rear direction in a floor tunnel which is convex upwardly from the floor panel; and
a flexible tubular member, the flexible tubular member having flexibility and being interposed between the rigid tubular member and the power generating motor;
wherein the cable is inserted through the rigid tubular member and the flexible tubular member; and
wherein a front end portion of the rigid tubular member is disposed in the floor tunnel at a portion on a vehicle rear side relative to a front edge of the floor tunnel, such that, when receiving a compressing force from a vehicle front side, the flexible tubular member is wound in a compressed state so as to be entered into the floor tunnel;
wherein a rear portion of the cable enters a cabin through a cabin entrance pipe;
wherein a rear side flexible tubular member having flexibility is interposed between a rear end portion of the rigid tubular member and the cabin entrance pipe;
wherein the cable is inserted through the rear side flexible tubular member, and
wherein the rear side flexible tubular member passes between a suspension frame and the lower surface of the floor panel.

2. The cable routing structure for a vehicle according to claim 1, wherein
a front end portion of the flexible tubular member is attached to a bracket which is attached to an engine system component.

3. The cable routing structure for a vehicle according to claim 1, wherein
a front end portion of the flexible tubular member is attached to the bracket of the engine system component by a clamp,
the rigid tubular member is disposed closer to one sidewall of the floor tunnel, and
the clamp is disposed closer to another sidewall of the floor tunnel, such that, when receiving a compressing force from the vehicle front side, the flexible tubular member is entered into a space between the rigid tubular member and the clamp.

4. A cable routing structure for a vehicle, comprising:
a dash panel separating a front part of the vehicle and a cabin, the front part of the vehicle having an engine compartment;
a floor panel connected to the dash panel;
a floor tunnel convex upwardly from a center portion, in a vehicle width direction, of the floor panel, the floor tunnel extending from the dash panel to a middle portion, in a vehicle front and rear direction, of the floor panel;
a cable connecting a power generating motor which is installed in a front part of the vehicle, and a battery which is installed in a rear part of the vehicle, the cable routed along a lower surface of the floor panel;
a rigid tubular member disposed on the floor tunnel along the vehicle front and rear direction, the rigid tubular member having rigidity; and
a flexible tubular member interposed between the rigid tubular member and the power generating motor, the flexible tubular member having flexibility;
wherein the cable is inserted through the rigid tubular member and the flexible tubular member;
wherein a front end portion of the rigid tubular member is disposed in the floor tunnel at a portion on a vehicle rear side relative to a front edge of the floor tunnel;
wherein the rigid tubular member is disposed closer to one sidewall of the floor tunnel, and the one side wall is close to one of the vehicle width direction;
wherein the flexible tubular member is extended from the front end portion of the rigid tubular member to a vehicle front side, continuously, is wound toward another of the vehicle width direction, and then is connected to the power generating motor;
wherein a clamp is attached to the flexible tubular member;
wherein the clamp is disposed closer to another sidewall of the floor tunnel, and the another sidewall is close to another of the vehicle width direction;
wherein a bracket is attached to an engine system component;
wherein the flexible tubular member is attached to the bracket by the clamp; and
wherein when receiving compressing force from a vehicle front side together with a movement of the engine system component, the flexible tubular member is wound in a compressed state so as to be entered into the floor tunnel.

* * * * *